(12) United States Patent
Shimadu (10) Patent No.: US 7,250,573 B2
(45) Date of Patent: Jul. 31, 2007

(54) AUTOMOTIVE CABLE HOLDING SYSTEM

(75) Inventor: Masaki Shimadu, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 14 days.

(21) Appl. No.: 11/469,060

(22) Filed: Aug. 31, 2006

(65) Prior Publication Data
US 2007/0044990 A1    Mar. 1, 2007

(30) Foreign Application Priority Data
Aug. 31, 2005    (JP) .............................. 2005-251749

(51) Int. Cl.
*H02G 3/06* (2006.01)
(52) U.S. Cl. ................. 174/72 C; 174/72 A; 174/70 C; 174/135; 16/2.1; 16/2.2
(58) Field of Classification Search .............. 174/70 C, 174/72 A, 72 C, 135, 138 F, 152 G, 153 G, 174/153 R; 16/2.1, 2.2, 2.5; 24/455, 457, 24/458; 191/22 R, 23 R; 248/49, 56, 65, 248/69, 73, 74.1, 74.2, 59
See application file for complete search history.

(56) References Cited

U.S. PATENT DOCUMENTS 5,039,040 A * 8/1991 Idjakiren ...................... 248/73
5,278,354 A * 1/1994 Lhomme .................... 174/84 S
6,062,516 A * 5/2000 Rizzo et al. ................ 248/74.2
6,262,372 B1 * 7/2001 Naegelin et al. ........... 174/94 S
6,320,134 B1 * 11/2001 Rehberg et al. ............. 174/135
6,417,451 B1 * 7/2002 Uchiyama .................. 174/72 A
6,971,816 B2 * 12/2005 Miyagawa et al. ........ 248/74.1

FOREIGN PATENT DOCUMENTS

JP    10-86716    4/1998

* cited by examiner

*Primary Examiner*—Angel R. Estrada
(74) *Attorney, Agent, or Firm*—Rankin, Hill, Porter & Clark LLP (57) ABSTRACT

The present invention relates to an automotive cable holding system for securing a vehicle body to a cable which is connected at one end to a locking mechanism for a rear seat backrest and at the other end to a releasing mechanism. The automotive cable holding system includes a bracket for holding an end of the cable and an insertion opening in the vehicle body into which the bracket is inserted, wherein the bracket has provided thereon abutment surfaces which abut the inner circumferential surfaces of the insertion opening, an engagement portion extending further outwards than the abutment surfaces at a position lying further inwards than the insertion opening inside the vehicle body and a clip portion disposed on the opposite side to the engagement portion inside the vehicle body.

11 Claims, 6 Drawing Sheets

AUTOMOTIVE CABLE HOLDING SYSTEM

This application claims priority under 35 USC 119 from Japanese Patent Application No. 2005-251749, the disclosure of which is herein incorporated by reference.

BACKGROUND

1. Technical Field

The present invention relates to an automotive cable holding system for holding a cable of a vehicle on to a vehicle body, and more particularly to an automotive cable holding system for holding a cable provided between a locking mechanism for a backrest of a rear seat and a manipulator unit for manipulating the locking mechanism to release the locking by the locking mechanism.

2. Related Art

As a conventional cable holding system, there is known a cable holding system in which a manipulator unit provided at one end portion of a cable is mounted on a vehicle body by pins (for example, see JP-A-10-86716).

In the cable holding system referred to above, however, the positioning of the manipulator unit relative to the vehicle body becomes necessary when mounting the manipulator unit on the vehicle body by the pins. When attempting to mount the manipulator unit on a lower side of a rear parcel shelf, for example, the fastening work using pins was difficult. In addition, the manipulator unit needs to be mounted strongly and firmly enough to resist a force with which the cable is pulled, and this tended to easily increase the number of man hours for mounting.

Therefore, the invention was made to provide an automotive cable holding system which can facilitate the mounting of the manipulator unit on the vehicle body and sufficiently bears the force with which the cable is pulled.

SUMMARY OF THE INVENTION

With a view to solving the problem, according to a first aspect of the invention, an automotive cable holding system is comprised of: a bracket that holds the cable, and an insertion opening in a vehicle body into which the bracket is inserted. The bracket is comprised of: an abutment surface that abuts an inner circumferential surface of the insertion opening, an engagement portion that extends further outwards than the abutment surface at a position lying further inwards than the insertion opening inside the vehicle body, and a clip portion disposed inside the vehicle body on a side opposite to the engagement portion.

According to a second aspect of the invention, the automotive cable holding system is a locking mechanism for a rear seat backrest.

According to a third aspect of the invention, the cable is disposed in a direction that is substantially perpendicular to a direction in which the engagement portion and the clip portion are positioned on the bracket.

According to a fourth aspect of the invention, the bracket is attached to a rear parcel shelf made of a thin steel sheet.

According to a fifth aspect of the invention, the bracket is attached to a cross member portion of the rear parcel shelf, which has a hollow closed cross sectional construction.

According to a sixth aspect of the invention, the cable comprises:

an outer cable held on the bracket; and an inner cable that is slidably passed through an interior of the outer cable.

According to a seventh aspect of the invention, the bracket comprises:

a vehicle body inserting portion comprising the engagement portion and the clip portion;

a cable holding portion disposed within a trunk of the vehicle.

According to an eighth aspect of the invention, the engagement portion is substantially a plate-shaped member, wherein an end of the plate-shaped member extending radially outwards from the insertion opening is slant upwardly relative to the abutment surface.

According to a ninth aspect of the invention, the clip portion comprising:

a support wall portion that rises upwards from the abutment surface;

an inclined wall portion that inclinedly and downwardly extends from the support wall portion so that a lower portion thereof is positioned further outwards than an upper portion thereof;

an engagement wall portion which is bent along a lower edge of the inclined wall portion so as to extend inwards; and a drooping wall portion which is bent along an inner edge of the engagement wall portion so as to extend downwards.

According to a tenth aspect of the invention, the clip portion further comprising:

a reinforcement rib provided on a back side of the support wall portion.

According to the first and second aspects of the invention, the bracket can be mounted on the vehicle body simply by inserting the bracket into the insertion opening, whereby the cable can easily be held on to the vehicle body. In addition, a force with which the cable is pulled can be borne by the abutment of the inner circumferential surface of the insertion opening in the vehicle body with the abutment surface of the bracket. Hence, the engagement of the clip portion with the vehicle body is never released which would otherwise be caused when the force with which the cable is pulled is inputted into the clip portion. Thus it is possible to effectively prevent the dislodgement of the bracket from the vehicle body.

According to the third aspect of the invention, by disposing the cable at substantially right angles to the direction in which the engagement portion and the clip portion are positioned on the bracket, a force generated along the cable when the cable is pulled is made difficult to affect the engagement of the bracket with the vehicle body at the engagement portion and the clip portion. Thus it is possible to prevent the dislodgement of the bracket from the vehicle body more effectively.

DETAILED DESCRIPTION OF THE PREFERRED EMBODIMENTS

Hereinafter, an embodiment of the invention will be described by reference to the accompanying drawings. Note that when used in the following description, directions or orientations indicated as front, rear, left, right and the like are understood to coincide with those on the vehicle provided. In addition, in the figures, an arrow indicated as FR indicates the front of the vehicle, an arrow indicated as LH indicates the left-hand side of the vehicle, and an arrow indicated as UP indicates an upward direction of the vehicle.

Figure 1:
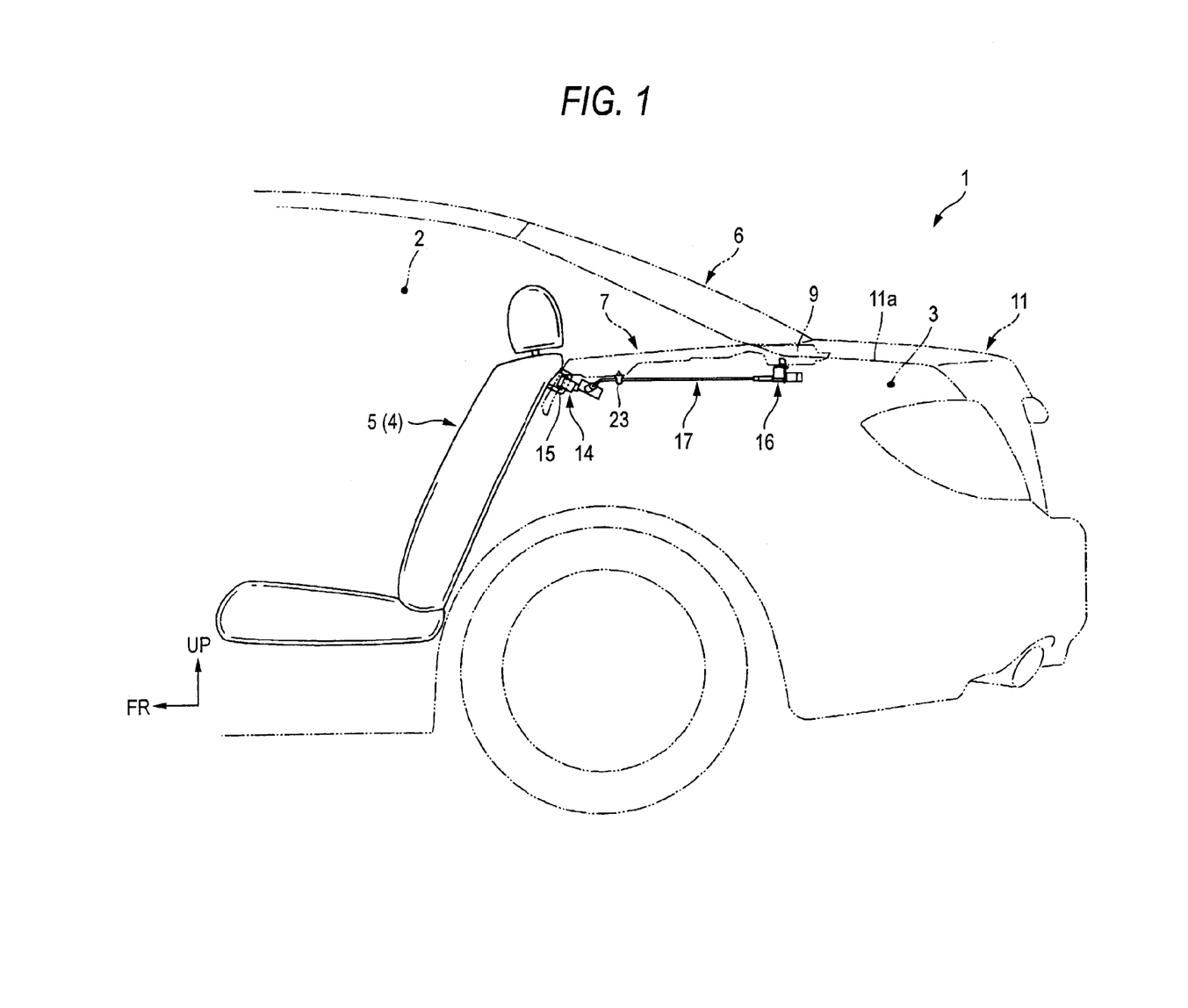
FIG. 1 is a side view of a rear part of a vehicle according to an embodiment of the invention.

FIG. 1 is an explanatory diagram showing a rear part of a vehicle body of a three-box or sedan-type motor vehicle (vehicle) 1, and as shown in the figure, a passenger compartment 2 and a trunk (luggage compartment) 3 which lies at the rear of the passenger compartment 2 are divided by a rear seat backrest 5 of a rear seat 4 lying inside the passenger compartment 2 and a substantially horizontal rear parcel shelf 7 along and between an upper edge portion of the rear seat backrest 5 and a lower edge portion of a backlight glass 6.

Figure 2:
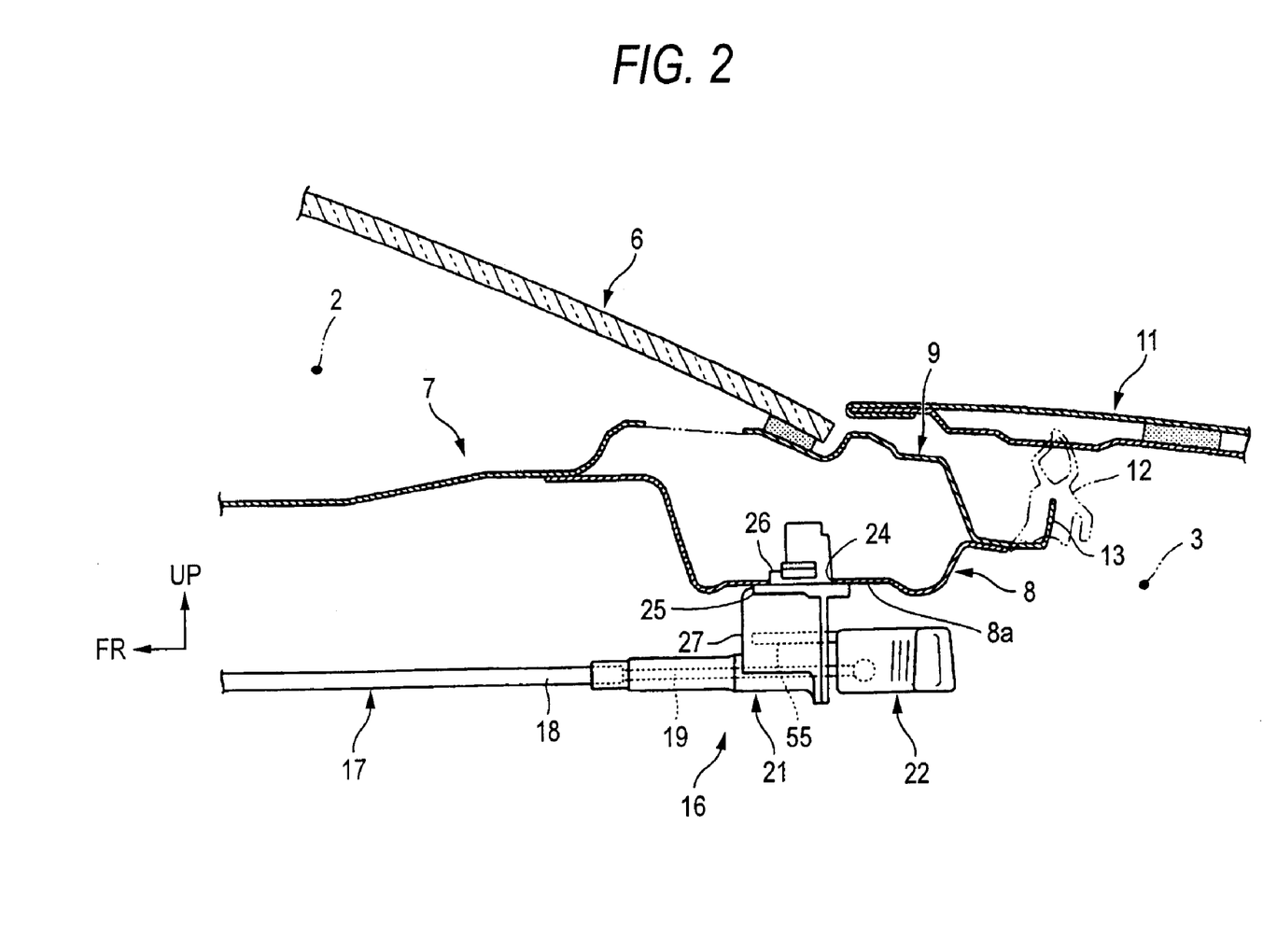
FIG. 2 is a side view showing a main part of a cable holding system of the vehicle.

To describe referring to FIG. 2 as well, the rear parcel shelf 7 is formed by shaping a thin steel sheet to a desired shape, in which a rear edge portion thereof is formed to have an upward protruding hat shaped cross-section and a reinforcement 8 having a downward protruding hat-shaped cross section is joined to the upward protruding hat-shaped rear edge portion from below (from the trunk 3 side), whereby a cross member portion 9 is formed which has a hollow closed cross sectional construction. The cross member portion 9 constitutes an upper edge portion of an opening 11a which is covered and uncovered by a trunk lid 11 and supports the lower edge portion of the backlight glass 6 at its upper wall portion. A seal flange 13 is formed along its rear edge portion for a weather strip 12 which is brought into close contact with a lower side of a front edge portion of the trunk lid 11.

The rear seat backrest 5 of the rear seat 4 is adapted to rotate the upper portion forwards around the lower end portion from a state where an occupant can properly sit in the rear seat 4 (a state where the rear seat backrest 5 is inclined so that its upper portion is positioned rearwards, see FIG. 1). A locking mechanism (the device provided on the vehicle body) 14 is disposed on a lower side of a front edge portion of the rear parcel shelf 7 (a deepest side within the trunk 3) in order to hold the rear seat backrest 5 in the state where the occupant can properly sit in the rear seat 4.

The locking mechanism 14 is brought into latch engagement with a striker 15 that protrudes from an upper portion on a rear side of the rear seat backrest 5 so that the rear seat backrest 5 is held in a state where the occupant can properly sit in the rear seat 4. The latch engagement is released by manipulating a releasing mechanism (the manipulator portion) 16 which is disposed on a lower side of a rear edge portion of the rear parcel shelf 7 (an opening 11a side within the trunk 3). The operation of the locking mechanism 14 and the manipulation of the releasing mechanism 16 is linked via a cable 17 which is laid out on a lower side of the rear parcel tray 7.

The cable 17 is such that an inner cable 19 is slidably passed through the interior of an outer cable 18. Since the cable 17 has flexibility, the cable 17 can be disposed while curved relatively freely. By sliding the inner cable 19 while holding the outer cable 18, a pulling force inputted to an end of the inner cable 19 can be transmitted to the other end thereof.

One end of the outer cable 18 is held to a casing (not shown) of the locking mechanism 14, while one end of the inner cable 19 is engaged with a release lever (not shown) of the locking mechanism 14 as well. At the same time, the other end of the outer cable 18 is held to a bracket 21 of the releasing mechanism 16, and the other end of the inner cable is engaged with a manipulator knob 22 of the releasing mechanism 16.

The casing of the locking mechanism 14 is fixed to the lower side of the front edge portion of the rear parcel shelf 7, and the bracket 21 of the releasing mechanism 16 is fixed to the lower side of the rear edge portion of the rear parcel shelf 7. In addition, the cable 17 is held to the vehicle body at both end portions thereof via the locking mechanism 14 and the releasing mechanism 16. An intermediate portion thereof is held to the rear parcel shelf 7 suitably via a holding clip 23.

Then, when the manipulator knob 22 is pulled relative to the bracket 21 as a releasing manipulation of the releasing mechanism 16, the locking mechanism 14 is deactivated via the cable 17 so as to release the lock of the rear seat backrest 5.

Figure 3:
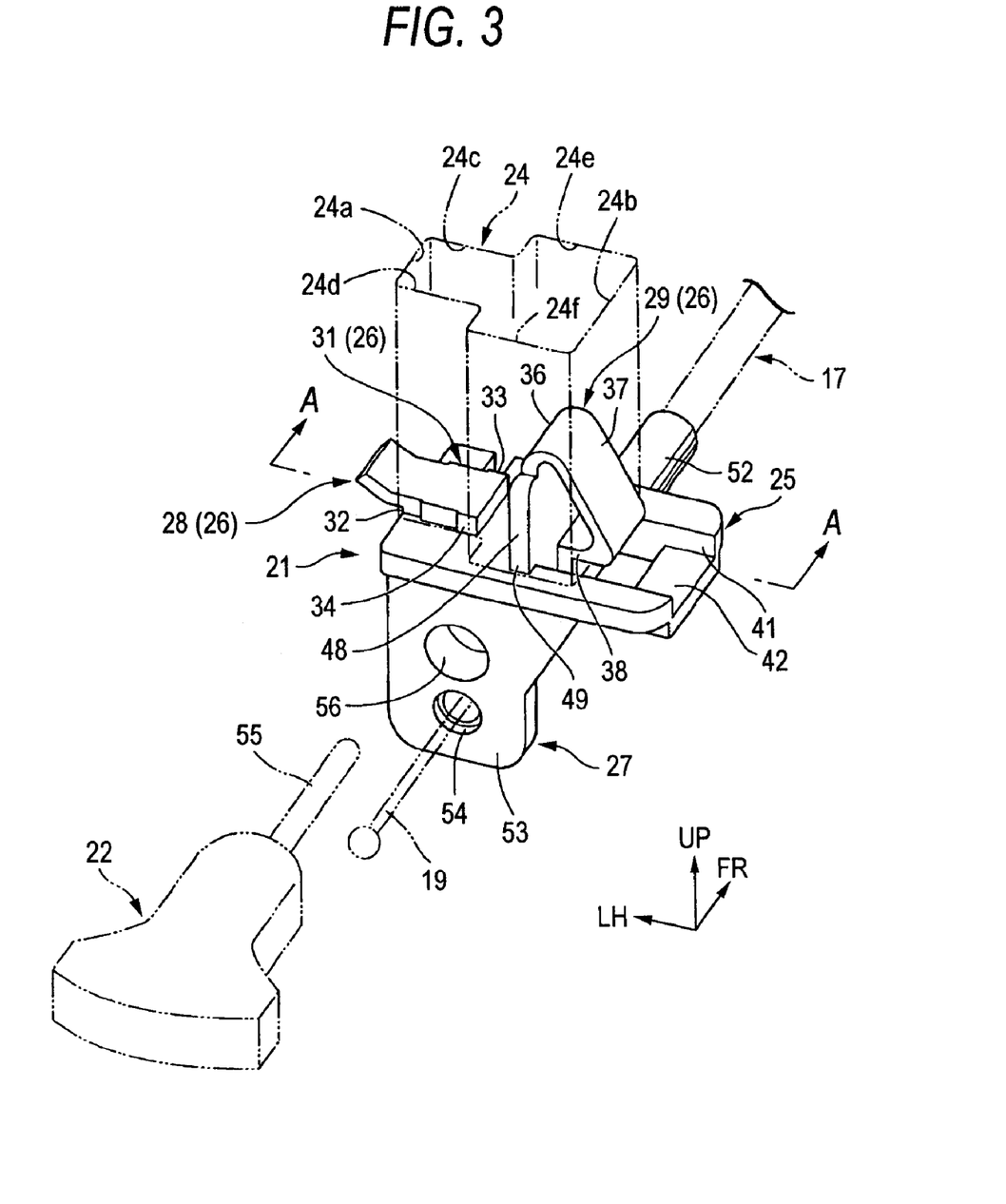
FIG. 3 is an expanded perspective view of the main part of the cable holding system.
Figure 4:
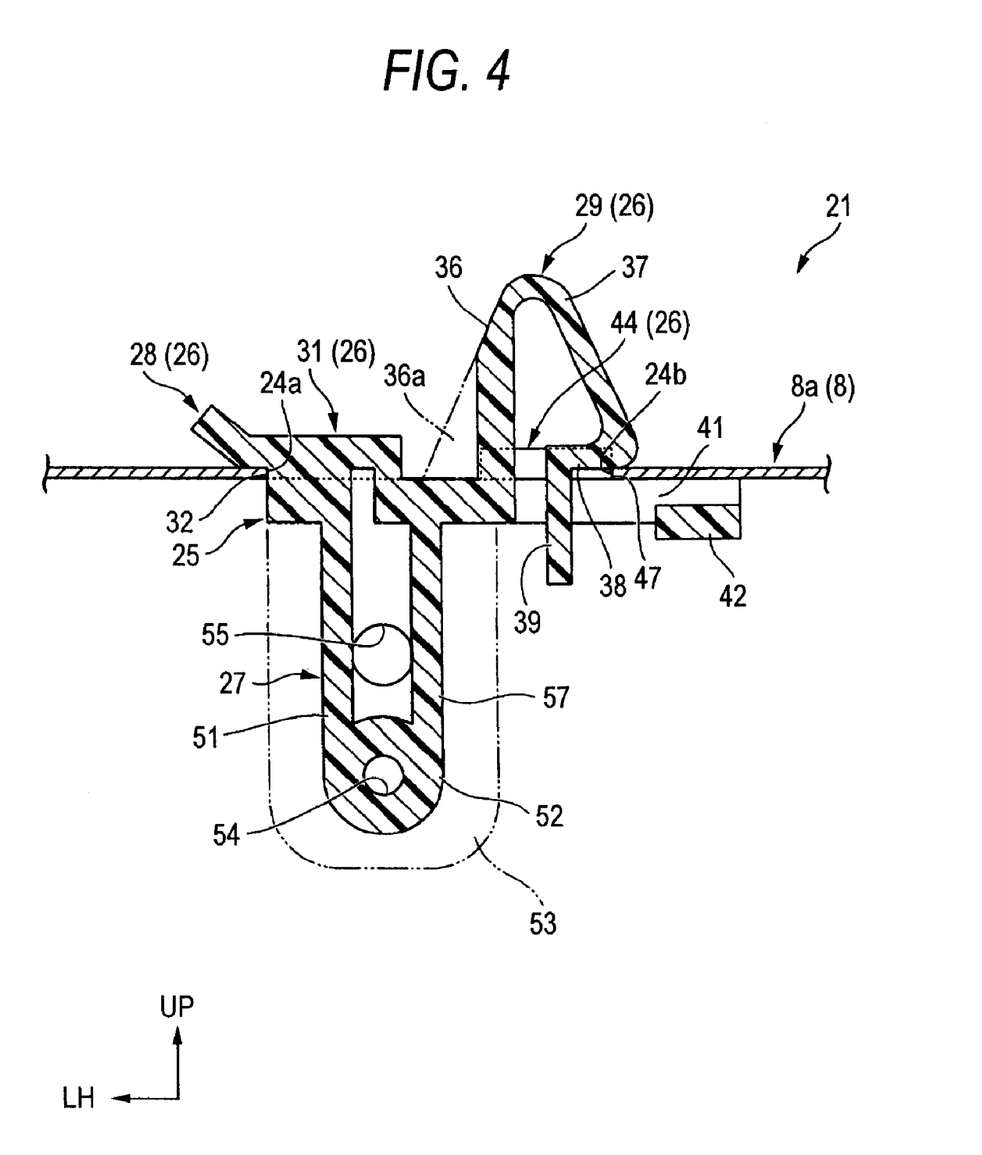
FIG. 4 is a sectional view taken along the line A-A of FIG. 3.

As shown in FIGS. 3, 4, the bracket 21 is inserted to be fixed in place in the insertion opening 24 which is formed in a substantially horizontal lower wall portion 8a (refer to FIG. 2.) of the reinforcement 8. The bracket 21 is made up of a plate-shaped base portion 25 which follows the lower wall portion 8a, a vehicle body inserting portion 26 which protrudes upwards from an upper surface of the base portion 25 and a cable holding portion 27 which protrudes downwards from a lower surface of the base portion 25. The base portion 25 and the cable holding portion 27 are disposed outside the closed cross section of the cross member portion 9 and within the trunk 3, while the vehicle body inserting portion 26 is disposed inside the closed cross section of the cross member portion 9 or inside the insertion opening 24.

The base portion 25 is formed into a quadrangular shape in which sides thereof extend longitudinally and laterally, and for example, an engagement portion 28 is disposed at a left-hand side portion on the upper surface thereof as part of the vehicle body inserting portion 26. Similarly, a clip portion 29 is disposed at a right-hand side portion on the upper surface thereof as part of the vehicle body inserting portion 26.

On the other hand, the insertion opening 24 is formed into a quadrangular shape in which sides thereof are caused to extend longitudinally and laterally in a left-hand side portion thereof, while it is formed into a quadrangular shape in a right-hand side portion thereof which is made larger in longitudinal width than the quadrangular shape of the left-hand side portion.

Then, the engagement portion 28 of the bracket 21 is inserted into the left-hand side portion of the insertion opening 24 so that the engagement portion 28 is brought into engagement with a location on the lower wall portion 8a of the reinforcement which lies further outwards than a left-hand side inner circumferential edge (surface) 24a of the insertion opening 24. The clip portion 29 is inserted into the right-hand side portion of the insertion opening 24 so that the clip portion 29 is brought into engagement with a location on the lower wall portion 8a which lies further inwards than a right-hand side inner circumferential edge (surface) 24b of the insertion opening 24, whereby the bracket 21 is mounted on the vehicle body.

The base portion 25 is larger than the insertion opening 24. When the bracket 21 is mounted on the vehicle body, the upper surface of the base portion 25 substantially abuts a lower face of the periphery of the insertion opening 24 which lies on the lower wall portion 8a of the reinforcement 8. As this occurs, a left-hand side edge (surface) of the base portion 25 is situated substantially on the same plane as the left-hand side inner circumferential edge 24a of the insertion opening 24.

A left upper changing portion 31, which is made to change its upper surface upwards in order to increase the thickness thereof, is formed in a quadrangular area in a longitudinally intermediate portion of the base portion 25 which resides at the left-hand side portion on the upper surface side of the base portion 25.

A left-hand side edge (surface) of the left upper changing portion 31 is level with the left-hand side edge of the base portion 25. The left-hand side edge of the left upper changing portion 31 is made to constitute a left abutment surface 32 which is brought into abutment with the left-hand side inner circumferential edge 24a of the insertion opening 24. Namely, the left upper changing portion 31 is disposed within the insertion opening 24 as part of the vehicle body inserting portion 26.

In addition, the engagement portion 28 extends from an upper portion of the left-hand side edge of the left upper changing portion 31 further outwards (in this case, leftwards) than the left abutment surface 32.

The engagement portion 28 is formed into a plate-like shape similar in form to the quadrangular shape of the left upper changing portion 31. An upper surface of the engagement portion 28 is level with the upper surface of the left upper changing portion 31, while a lower surface thereof is brought into abutment with the upper surface of the lower wall portion 8a of the reinforcement 8 in such a state that the bracket 21 is mounted. In addition, a distal end portion of the engagement portion 28 is made to incline in such a manner that a distal end is positioned above (inside the vehicle body) so as to facilitate the insertion thereof into the insertion opening 24.

Figure 5:
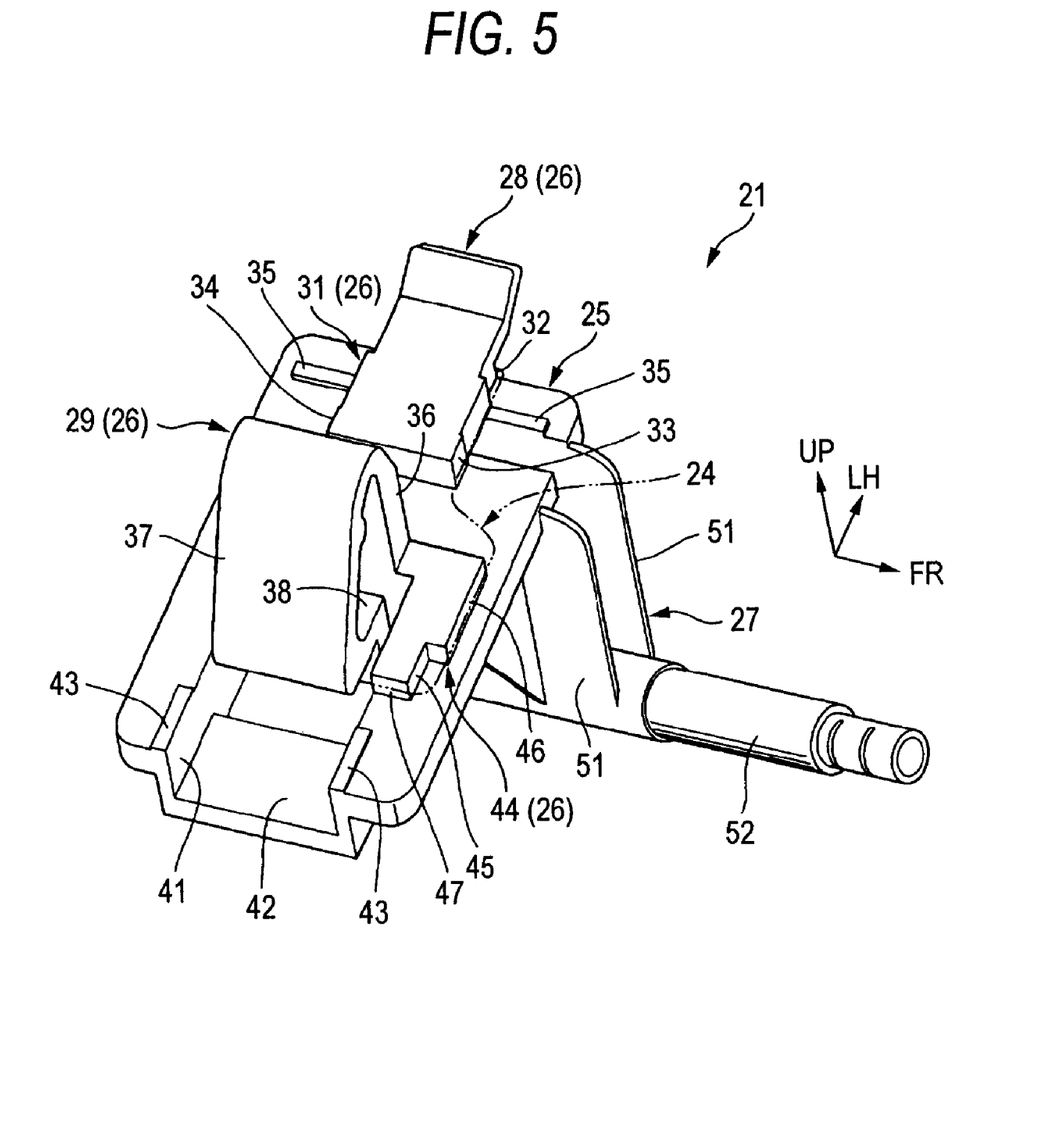
FIG. 5 is a perspective view of a bracket of the cable holding system.
Figure 6:
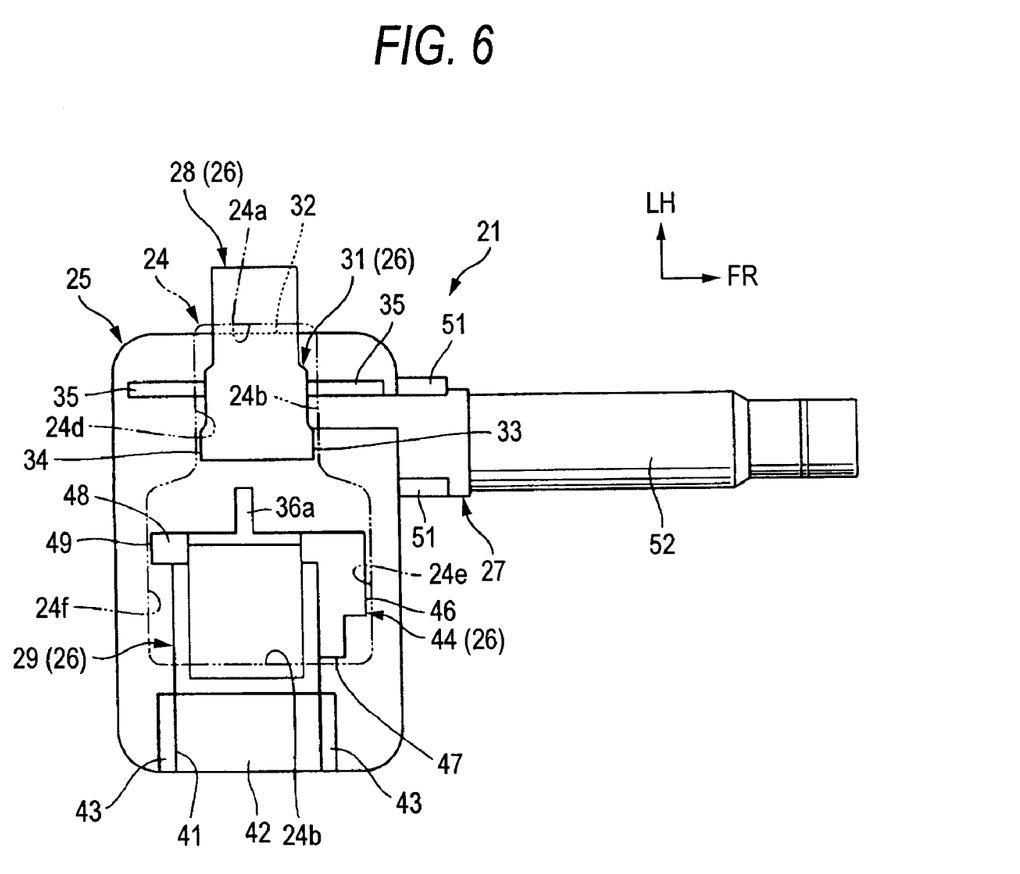
FIG. 6 is a plan view of the bracket.

To continue the description while referring to FIGS. 5, 6 as well, the longitudinal width of the left upper changing portion 31 at the left-hand side portion is made to be the same as that of the engagement portion 28. The left upper changing portion 31 is formed such that front and rear edge portions thereof change in three steps to increase the longitudinal width of the left upper changing portion 31 in an area further inwards (in this case, rightwards) than the left-hand side portion. The front and rear edges (surfaces) of the left upper changing portion 31 at a innermost location (a location where the longitudinal width thereof becomes maximum) are made to constitute left front and rear abutment surfaces 33, 34 which abut front and rear inner circumferential edges (surfaces) 24c, 24d of the left-hand side portion of the insertion opening 24, when the bracket 21 is mounted on the vehicle body. In addition, a left protruding portion 35 which protrudes slightly upwards is provided on each of the front and rear of the left upper changing portion 31 in such a manner as to extend longitudinally, so as to prevent the occurrence of looseness between the base portion 25 and the lower wall portion 8a of the reinforcement 8.

The clip portion 29 is formed by suitably bending a belt-like element having a predetermined longitudinal width. The clip portion 29 has a support wall portion 36 which rises upwards from an upper surface of a right-hand side portion of the base portion 25, an inclined wall portion 37 which is bent along an upper edge of the support wall portion 36 so as to extend downwards in an inclined fashion in such a manner that a lower portion is positioned further outwards (in this case, rightwards) than an upper portion thereof, an engagement wall portion 38 which is bent along a lower edge of the inclined wall portion 37 so as to extend inwards (in this case, leftwards), and a drooping wall portion 39 which is bent along an inner edge of the engagement wall portion 38 so as to extend downwards. In addition, a reinforcement triangular rib 36a is provided on a back side of the support wall portion 36.

A lower surface of the engagement wall portion 38 lies level with the upper surface of the lower wall portion 8a of the reinforcement 8 so as to be brought into abutment therewith, when the bracket 21 is mounted on the vehicle body. The clip portion 29 is thereby allowed to be brought into engagement with a portion on the lower wall portion 8a of the reinforcement 8 which lies further outwards than the right-hand side inner circumferential edge 24b of the insertion opening 24.

A cut-out portion 41 is provided in the right-hand side portion of the base portion 25 by cutting out an area which is slightly wider than the clip portion 29. The drooping wall portion 39 protrudes downwards from the lower surface of the base portion 25 in such a manner as to pass through the cut-out portion 41.

The right-hand side portion of the base portion 25 is branched longitudinally as a result of the provision of the cut-out portion 41, and branched portions of the right-hand side portion are connected together by a connecting plate 42 where the right-hand side portion extends further rightwards. The connecting plate 42 becomes substantially parallel to the base portion 25 and is provided offset downwards so that an upper surface of the connecting plate 42 is spaced apart from the upper surface of the base portion 25. In addition, protruding portions 43, which are similar to the protruding portions 35 provided on the left-hand side portion of the base portion 25, are provided on each of the front and rear branched portions of the right-hand side portion of the base portion 25 in such a manner as to extend laterally.

In the clip portion 29, in order to allow for the engagement wall portion 38 to move inwards, the inclined wall portion 37 is mainly adapted to deform elastically. The elastic deformation of the clip portion 29 causes the engagement wall portion 38 to move inwards to release the engagement with the lower wall portion 8a of the reinforcement 8.

On the other hand, when mounting the bracket 21 on the reinforcement 8, firstly, the bracket 21 is set inclined relative to the lower wall portion 8a in such a manner as to insert only the engagement portion 28 of the bracket 21 into the left-hand side portion of the insertion opening 24. The left abutment surface 32 of the bracket 21 is brought into abutment with the left-hand side inner circumferential edge 24a of the insertion opening 24, whereby the clip portion 29 is allowed to be positioned directly below the right-hand side portion of the insertion opening 24.

Next, the bracket 21 is tilted about a contact point between the left abutment surface 32 of the bracket 21 and the left-hand side inner circumferential edge 24a of the insertion opening 24 so as to move the clip portion 29 upwards. The clip portion 29 is thereby inserted into the right-hand side portion of the insertion opening 24. As this occurs, the clip portion 29 is deformed elastically as has been described above while being guided by an outer surface of the inclined wall portion 37, and the outer surface of the inclined wall portion 37 and the right-hand side inner circumferential edge 24b of the insertion opening 24 are brought into sliding contact with each other.

Then, when the inclined wall portion 37 has passed through the insertion opening 24, the clip portion 29 is restored from the elastically deformed state. As this occurs, the base portion 25 of the bracket 21 becomes parallel to the lower wall portion 8a of the reinforcement 8, and the protruding portions 35, 43 are then brought into abutment with the lower wall portion 8a. At this point in time, the engagement portion 28 comes to engage with a portion of the lower wall portion 8a which lies further outwards than the left-hand side inner circumferential edge 24a of the insertion opening 24. The clip 29 comes to engage with a portion of the lower wall portion 8a which lies further outwards than the right-hand side inner circumferential edge 24b of the insertion opening 24.

As a result, a state results where the movement of the bracket 21 in a direction which intersects the lower wall portion 8a of the reinforcement 8 at substantially right angles (i.e., the direction in which the bracket 21 is inserted and dislodged relative to the insertion opening 24) is restricted, that is, the bracket 21 is mounted on the vehicle body.

A right upper changing portion 44, which changes its upper surface in such a manner as to increase its thickness, is formed in a quadrangular area in front of the clip portion 29 at the right-hand side portion on the upper surface side of the base portion 25. In addition, a cut-out portion 45 is provided in a right front corner of the right upper changing portion 44 so as to secure a gap between a right front corner portion of the insertion opening 24 and itself.

A front edge (surface) of the right upper changing portion 44 is made to constitute a right front abutment surface 46 which is brought into abutment with a front inner circumferential edge (surface) 24e of the right-hand side portion of the insertion opening 24 in such a state that the bracket 21 is mounted on the vehicle body. A right-hand side edge (surface) of the right upper changing portion 44 is made to constitute a right abutment surface 47 which is brought into abutment with the right-hand side inner circumferential edge 24b of the insertion opening 24, in such a state that the bracket 21 is mounted on the vehicle body. Namely, the right upper changing portion 44 is disposed within the insertion opening 24 as part of the vehicle body inserting portion 26.

In addition, an expanding portion 48 is provided on a rear edge portion of the support wall portion 36 of the clip portion 29 which is formed by expanding the rear edge portion rearwards. As with the clip portion 29, this expanding portion 48 is also part of the vehicle body inserting portion 26. A lower portion of a rear edge (surface) of the expanding portion 48 is made to constitute a right rear abutment surface 49 which is brought into abutment with a rear inner circumferential edge (surface) 24f of the right-hand side portion of the insertion opening 24 in such a state that the bracket 21 is mounted on the vehicle body. In addition, the expanding portion 48 is formed into a tapered shape that suppresses the expansion of an upper portion thereof so as to facilitate the insertion of the clip portion 29 into the insertion opening 24.

Then, when the abutment surfaces 32, 33, 34, 46, 47, 49 on the left upper changing portion 31, the right upper changing portion 44 and the expanding portion 48 are brought into abutment with the corresponding inner circumferential edges 24a to 24f of the insertion opening 24, respective movements of the relevant portions of the bracket 21 in respective directions along the lower wall portion 8a are restricted in such a state that the bracket 21 is mounted on the vehicle body. In addition, a slight gap is set between the corresponding abutment surfaces and inner circumferential edges, respectively, in order to facilitate the mounting and dismounting of the bracket 21. Additionally, the right-hand side inner circumferential edge 24b of the insertion opening 24 and the drooping wall portion 39 of the clip portion 29 are spaced apart from each other. Even when the bracket 21 moves finely along the surface of the lower wall portion 8a, there occurs no case where the clip portion 29 is pressed against by the inner circumference of the insertion opening 24 to thereby be deformed.

Incidentally, the cable holding portion 27 has a pair of ribs 51, each formed into a plate-like shape which intersects a lateral direction at substantially right angles, which are provided in such a manner as to extend downwards from portions residing between the engagement portion 28 and the clip 29 on the lower surface of the base portion 25. A longitudinally extending cylindrical cable passing-through portion 52 is supported at distal end portions by the pair of ribs 51. The cable passing-through portion 52 extends forwards and holds the outer cable 18 at a distal portion thereof, allowing the inner cable 19 to pass through an interior thereof.

A rear wall portion 53 is formed on a rear-end side of the cable holding portion 27 in such a manner as to intersect the longitudinal direction at substantially right angles. The inner cable 19 is guided out rearwards from a cable passing-through hole 54 formed in a lower potion of the rear wall portion 53, so that an end of the inner cable 19 is brought into engagement with the manipulator knob 22 at one end thereof. When the manipulator knob 22 is manipulated to be pulled rearwards relative to the bracket 21, the locking mechanism 14 is deactivated via the cable 17 (the inner cable 19). In addition, a rod 55 is provided on the manipulator knob 22 for guiding the manipulating direction (the pulling direction) of the manipulator knob 22, and the rod 55 is held in a guide hole 56 formed in an upper portion of the rear wall portion 53 in such a manner as to be freely move into and out of the guide hole 56.

Here, the cable 17 is provided in such a manner as to extend along a direction (the longitudinal direction) which intersects at substantially right angles the direction (the lateral direction) in which the engagement portion 28 and the clip portion 29 are disposed on the bracket 21 at least in the vicinity of the bracket 21. In other words, the cable 17 is provided in such a manner as to extend along the direction which intersects at substantially right angles the direction in which the engagement portion 28 extends and the direction in which the clip portion 29 deflects.

An operation reaction force received by the bracket 21 when the manipulator knob 22 is manipulated to deactivate the locking mechanism 14 (or is manipulated to be pulled) is produced along the direction in which the cable 17 extends. Therefore, there occurs no case where the operation reaction force acts to release the engagement of, in particular, the clip portion 29 having a deflecting margin in a direction which intersects the cable 17 at right angles with the vehicle body. Consequently, even in a construction in which part of the movement of the bracket 21 in the direction following the lower wall portion 8a is restricted by the abutment of part of the clip portion 29 with the inner circumferential edge of the insertion opening 24, there also occurs no case where the clip portion 29 is deformed by the operation reaction force so as to release the engagement thereof with the vehicle body.

As has been described above, according to the embodiment, there is provided the automotive cable holding system for holding on to the vehicle body the cable 17 which is connected at one end to the locking mechanism 14 for the rear seat backrest 5 and at the other end to the releasing mechanism 16 for manipulating the locking mechanism 14. The automotive cable holding system includes: the bracket 21 for holding the other end of the cable 17 and the insertion opening 24 in the vehicle body into which the bracket 21 is inserted, wherein the bracket 21 has provided thereon the abutment surfaces 32, 33, 34, 46, 47, 49 which are adapted to be brought into abutment with the inner circumferential surfaces of the insertion opening 24, the engagement portion 28 extending further outwards than the abutment surfaces at the position lying further inwards than the insertion opening 24 inside the vehicle body, and the clip portion 29 disposed on the opposite side to the engagement portion 28 inside the vehicle body.

According to the configuration that has been described above, the bracket 21 can simply be mounted on the vehicle body only by inserting the bracket 21 into the insertion opening 24, whereby the cable 17 can easily be held on to the vehicle body. In addition, the force with which the cable 17 is pulled can be borne by the abutment of the inner circumferential surfaces of the insertion opening 24 in the vehicle body with the corresponding abutment surfaces of the bracket 21. Hence, there occurs no case where the force generated when the cable 17 is pulled is inputted into the clip portion 29 to thereby release the engagement of the clip portion 29 with the vehicle body, thereby preventing the dislodgement of the bracket 21 from the vehicle body effectively.

In addition, in the cable holding system that has been described above, since the cable 17 is disposed to intersect at substantially right angles the direction in which the engagement portion 28 and the clip portion 29 are disposed on the bracket 21, the force produced along the cable 17 when the cable 17 is pulled is made difficult to affect the engagement of the bracket 21 with the vehicle body at the engagement portion 28 and the clip portion 29. It is thereby possible to prevent the dislodgement of the bracket 21 from the vehicle body effectively.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An automotive cable holding system comprising:
   a vehicle frame having an insertion opening;
   an operation device provided on a vehicle side;
   a manipulation device that manipulates the operation device;
   a cable that connects the operation device with the manipulation device; and
   a bracket that holds the cable such that the cable is slidable and that locks with the vehicle frame upon insertion into the insertion opening, the bracket comprising:
   an abutment surface that abuts at least a surface of the vehicle frame that surrounds the insertion opening;
   an engagement portion that is provided on an inner side of the vehicle frame and extends radially outwards from the insertion opening; and
   a clip portion that extends through the insertion opening into the inner side of the vehicle frame on a side substantially across from the engagement portion with respect to the insertion opening.

2. The automotive cable holding system as set forth in claim 1, wherein the automotive cable holding system is a locking mechanism for a rear seat backrest.

3. The automotive cable holding system as set forth in claim 1, wherein the cable is disposed in a direction that is substantially perpendicular to a direction in which the engagement portion and the clip portion are positioned on the bracket.

4. The automotive cable holding system as set forth in claim 1, wherein the bracket is attached to a rear parcel shelf made of a thin steel sheet.

5. The automotive cable holding system as set forth in claim 4, wherein the bracket is attached to a cross member portion of the rear parcel shelf, which has a hollow closed cross sectional construction.

6. The automotive cable holding system as set forth in claim 1, wherein the cable comprises:
   an outer cable held on the bracket; and
   an inner cable that is slidably passed through an interior of the outer cable.

7. The automotive cable holding system as set forth in claim 1, wherein the bracket comprises:
   a vehicle body inserting portion comprising the engagement portion and the clip portion;
   a cable holding portion disposed within a trunk of the vehicle.

8. The automotive cable holding system as set forth in claim 1, wherein the engagement portion is substantially a plate-shaped member,
   wherein an end of the plate-shaped member extending radially outwards from the insertion opening is slant upwardly relative to the abutment surface.

9. The automotive cable holding system as set forth in claim 1, wherein the clip portion comprises:
   an elastic engagement portion that is elastically engaged with an opposite side of the engagement portion; and
   a drooping wall portion that extends outwards of the vehicle frame from the insertion opening and releases the elastic engagement portion from the vehicle frame.

10. An automotive cable holding system comprising:
    a vehicle frame having an insertion opening;
    an operation device provided on a vehicle side;
    a manipulation device that manipulates the operation device;
    a cable that connects the operation device with the manipulation device: and
    a bracket that holds the cable and that locks with the vehicle frame upon insertion into the insertion opening, the bracket comprising;
    an abutment surface that abuts at least a surface of the vehicle frame that surrounds the insertion opening;
    an engagement portion that is provided on an inner side of the vehicle frame and extends radially outwards from the insertion opening: and
    a clip portion that extends through the insertion opening into the inner side of the vehicle frame on a side substantially across from the engagement portion with respect to the insertion opening, the clip portion comprising:
    a support wall portion that rises upwards from the abutment surface;
    an inclined wall portion that inclinedly and downwardly extends from the support wall portion so that a lower portion thereof is positioned further outwards than an upper portion thereof;

an engagement wall portion which is bent along a lower edge of the inclined wall portion so as to extend inwards; and a drooping wall portion which is bent along an inner edge of the engagement wall portion so as to extend downwards.

11. The automotive cable holding system as set forth in claim 10, wherein the clip portion further comprising:

a reinforcement rib provided on a back side of the support wall portion.

* * * * *